United States Patent
Liu et al.

(10) Patent No.: US 12,488,265 B2
(45) Date of Patent: Dec. 2, 2025

(54) OPTIMIZING A PROGNOSTIC-SURVEILLANCE SYSTEM TO ACHIEVE A USER-SELECTABLE FUNCTIONAL OBJECTIVE

(71) Applicant: Oracle International Corporation, Redwood Shores, CA (US)

(72) Inventors: Menglin Liu, San Mateo, CA (US); Richard P. Sonderegger, Dorchester, MA (US); Kenneth P. Baclawski, Waltham, MA (US); Dieter Gawlick, Palo Alto, CA (US); Anna Chystiakova, Palo Alto, CA (US); Guang C. Wang, San Diego, CA (US); Zhen Hua Liu, San Mateo, CA (US); Hariharan Balasubramanian, Redmond, WA (US); Kenny C. Gross, Escondido, CA (US)

(73) Assignee: Oracle International Corporation, Redwood City, CA (US)

( * ) Notice: Subject to any disclaimer, the term of this patent is extended or adjusted under 35 U.S.C. 154(b) by 1103 days.

(21) Appl. No.: 17/386,965

(22) Filed: Jul. 28, 2021

(65) Prior Publication Data
US 2023/0035541 A1     Feb. 2, 2023

(51) Int. Cl.
*G06N 7/06*      (2006.01)
*G06F 18/21*     (2023.01)
(Continued)

(52) U.S. Cl.
CPC ......... *G06N 7/06* (2013.01); *G06F 18/21326* (2023.01); *G06F 18/2193* (2023.01);
(Continued)

(58) Field of Classification Search
CPC .. G06N 7/06; G06N 5/04; G06N 7/01; G06N 20/00; G06F 18/21326; G06F 18/2193; G06F 18/214
See application file for complete search history.

(56) References Cited

U.S. PATENT DOCUMENTS 10,964,130 B1 *  3/2021  Dixit ................. G05B 23/0283
11,130,422 B1 *  9/2021  Goldfarb .................. F03D 9/32
(Continued)

OTHER PUBLICATIONS

Sharma et Atkins, "Prognostics-Informed Battery Reconfiguration in a Multi-Battery Small UAS Energy System" Mar. 2, 2021, arXiv:2103.01883v1, pp. 1-10. (Year: 2021).*

(Continued)

*Primary Examiner* — Vincent Gonzales
*Assistant Examiner* — Chase P. Hinckley
(74) *Attorney, Agent, or Firm* — Kilpatrick Townsend & Stockton LLP

(57) ABSTRACT

The disclosed embodiments relate to a system that optimizes a prognostic-surveillance system to achieve a user-selectable functional objective. During operation, the system allows a user to select a functional objective to be optimized from a set of functional objectives for the prognostic-surveillance system. Next, the system optimizes the selected functional objective by performing Monte Carlo simulations, which vary operational parameters for the prognostic-surveillance system while the prognostic-surveillance system operates on synthesized signals, to determine optimal values for the operational parameters that optimize the selected functional objective.

20 Claims, 11 Drawing Sheets

(51) Int. Cl.
  G06F 18/2132 (2023.01)
  G06N 5/04 (2023.01)
  G06F 18/214 (2023.01)
  G06N 7/01 (2023.01)
  G06N 20/00 (2019.01)
(52) U.S. Cl.
  CPC ............. *G06N 5/04* (2013.01); *G06F 18/214* (2023.01); *G06N 7/01* (2023.01); *G06N 20/00* (2019.01)

(56) References Cited

U.S. PATENT DOCUMENTS

| | | | |
|---|---|---|---|
| 11,983,854 B2* | 5/2024 | Isik | G06T 3/40 |
| 2018/0341876 A1* | 11/2018 | Ghosh | G05B 23/0221 |
| 2020/0184351 A1* | 6/2020 | Wang | G01R 23/20 |
| 2020/0218801 A1* | 7/2020 | Gross | G06F 21/577 |
| 2020/0242483 A1* | 7/2020 | Shashikant Rao | G06F 16/285 |
| 2020/0410090 A1* | 12/2020 | Baker | G06N 20/20 |
| 2021/0326759 A1* | 10/2021 | Ardel | G05B 23/0254 |
| 2021/0349157 A1* | 11/2021 | Srinivasan | G01R 31/389 |
| 2021/0382447 A1* | 12/2021 | Stano | G01N 15/0618 |
| 2021/0382473 A1* | 12/2021 | Stano | G05B 23/0283 |
| 2022/0261657 A1* | 8/2022 | Puzanov | G06N 3/045 |
| 2022/0335574 A1* | 10/2022 | Tang | G06V 10/806 |
| 2022/0357734 A1* | 11/2022 | Amakawa | G05B 23/024 |
| 2022/0390514 A1* | 12/2022 | Winston | G01R 31/318357 |
| 2022/0398446 A1* | 12/2022 | Xie | G06N 3/094 |

OTHER PUBLICATIONS

More et al., "SimML Framework: Monte Carlo Simulation of Statistical Machine Learning Algorithms for IoT Prognostic Applications" 2016, pp. 174-179. (Year: 2016).*
Jin et al., Are Ensemble Classifiers Powerful Enough for the Detection and Diagnosis of Intermediate-Severity Faults? Jul. 8, 2020, arXiv: 2007.03167v2, pp. 1-12. (Year: 2020).*
Zhao et al., "Streaming Variational Monte Carlo" Feb. 29, 2020, arXiv: 1906.01549v3, pp. 1-12. (Year: 2020).*
Gross et Wang, "AI Decision Support Prognostics for IoT Asset Health Monitoring, Failure Prediction, Time to Failure" 2019, pp. 244-248. (Year: 2019).*
Wang et al., "Neural Architecture Search using Deep Neural Networks and Monte Carlo Tree Search" Nov. 21, 2019, arXiv:1805.07440v5, pp. 1-13. (Year: 2019).*
Wei et al., "Remaining useful life prediction of lithium-ion batteries based on Monte Carlo Dropout and gated recurrent unit" May 18, 2021, pp. 2862-2871. (Year: 2021).*
Thin et al., "Monte Carlo Variational Auto-Encoders" Jun. 30, 2021, arXiv: 2106.15921v1, pp. 1-18. (Year: 2021).*
Que et al., "Remaining Useful Life Prediction for Bearings based on a Gated Recurrent Unit" Feb. 26, 2021, pp. 1-11. (Year: 2021).*
Jin et al., "Using Ensemble Classifiers to Detect Incipient Anomalies" Aug. 20, 2020, arXiv: 2008.08710v1, pp. 1-25. (Year: 2020).*
Huang et al., "Bayesian Neural Network Based Method of Remaining Useful Life Prediction and Uncertainty Quantification for Aircraft Engine" 2020, pp. 1-8. (Year: 2020).*
Ebihara et al., "Sequential Density Ratio Estimation for Simultaneous Optimization of Speed and Accuracy" Feb. 6, 2021, arXiv: 2006.05587v3, pp. 1-63. (Year: 2021).*
Chen et al., "Monte Carlo Filtering Objectives: A New Family of Variational Objectives to Learn Generative Model and Neural Adaptive Proposal for Time Series" May 20, 2021, arXiv: 2105.09801v1, pp. 1-23. (Year: 2021).*
Carrazza et al., "MadFlow: automating Monte Carlo simulation on GPU for particle physics processes" Jun. 18, 2021, arXiv: 2106.10279v1, pp. 1-7. (Year: 2021).*
Martin et al., "The Monte Carlo Transformer: a stochastic self-attention model for sequence prediction" Dec. 15, 2020, arXiv: 2007.08620v2, pp. 1-21. (Year: 2020).*
Silva et al., "Surrogate Monte Carlo" Feb. 10, 2021, arXiv: 2102.08186v1, pp. 1-6. (Year: 2021).*
Davies et al., "The Application of Time Series Modelling and Monte Carlo Simulation: Forecasting Volatile Inventory Requirements" 2014, pp. 1-17. (Year: 2014).*
Chopin et Papaspiliopoulos, "An Introduction to Sequential Monte Carlo" Oct. 2020, Springer, pp. i-390. (Year: 2020).*

* cited by examiner

OPTIMIZING A PROGNOSTIC-SURVEILLANCE SYSTEM TO ACHIEVE A USER-SELECTABLE FUNCTIONAL OBJECTIVE

BACKGROUND

Field

The disclosed embodiments generally relate to techniques for using machine-learning (ML) models to perform prognostic-surveillance operations based on sensor signals received from a monitored asset. More specifically, the disclosed embodiments relate to a technique for optimizing a prognostic-surveillance system to achieve a user-selectable functional objective.

Related Art

Large numbers of sensors are presently being deployed to monitor the operational health of critical assets in a large variety of business-critical systems. For example, a medium-sized computer data center can include over 1,000,000 sensors monitoring thousands of servers, a modern passenger jet can include 75,000 sensors, an oil refinery can include over 1,000,000 sensors, and even an ordinary car can have over 100 sensors. These sensors produce large volumes of time-series sensor data, which can be used to perform prognostic-surveillance operations to facilitate detecting incipient anomalies. This makes it possible to take remedial action before the incipient anomalies develop into failures in the monitored assets.

ML-based prognostic-surveillance techniques typically operate by training an ML model (also referred to as an "inferential model") to learn correlations among time-series signals. The trained ML model is then placed in a surveillance mode where it is used to predict values for time-series signals based on the correlations with other time-series signals, wherein deviations between actual and predicted values for the time-series signals trigger alarms that indicate an incipient anomaly. This makes it possible to perform remedial actions before the underlying cause of the incipient anomaly leads to a catastrophic failure.

However, there exist complex tradeoffs among various operational functional objectives that directly affect the effectiveness of a prognostic-surveillance system in specific use cases. In particular, the following three main functional objectives define a "Quality of Information" (QOI) for a prognostic-surveillance system. (1) Fast Anomaly Detection—It is desirable in safety-critical and mission-critical systems to provide early warnings for subtle incipient faults in noisy process signals. An early warning provides more time for a human operator to take appropriate actions to mitigate or avoid costly or dangerous failures, and more time for automated techniques to proactively schedule service actions. (2) High Prognostic Accuracy—It is also desirable for prognostic-surveillance systems to make accurate predictions about whether anomalies exist, wherein this "prognostic accuracy" can be measured in terms of false-alarm probabilities (FAPs) and missed-alarm probabilities (MAPs). (3) Low Compute Cost—In other systems, prognostic accuracy and early anomaly detection are somewhat less important and it is more important to achieve an acceptable compute cost. This is especially critical in large-scale time-series databases, wherein it is important to reduce memory footprint requirements, caching requirements, and overall compute cost.

However, researchers have discovered that there exist complex and nonlinear tradeoffs among these three primary QOI objectives. Hence, an inherent challenge (and opportunity) exists in attempting to simultaneously achieve the three functional requirements because they are associated with competing objectives. This means it is impossible to configure a prognostic-surveillance system to optimize all three objectives simultaneously. This is because improving the prognostic-surveillance system to meet any one objective can cause progress toward the other two objectives to decrease. Also, it is rarely the case that a customer desires, needs, or is interested in paying for all three objectives to be achieved for a specific use case.

Hence, what is needed is technique for optimizing a prognostic-surveillance system to achieve one or more functional objectives for a specific prognostic-surveillance use case.

SUMMARY

The disclosed embodiments relate to a system that optimizes a prognostic-surveillance system to achieve a user-selectable functional objective. During operation, the system allows a user to select a functional objective to be optimized from a set of functional objectives for the prognostic-surveillance system. Next, the system optimizes the selected functional objective by performing Monte Carlo simulations, which vary operational parameters for the prognostic-surveillance system while the prognostic-surveillance system operates on synthesized signals, to determine optimal values for the operational parameters that optimize the selected functional objective.

In some embodiments, the set of functional objectives for the prognostic-surveillance system includes: (1) fast anomaly detection, which can be evaluated in terms of an average sample number (ASN) for a detection decision; (2) high prognostic accuracy, which can be evaluated in terms of false alarm probabilities (FAPs) and missed alarm probabilities (MAPs); and (3) low compute cost, which can be evaluated in terms of required computational operations and memory usage.

In some embodiments, the prognostic-surveillance system uses an inferential model while detecting incipient anomalies, wherein the operational parameters include one or more of the following: a number of signals in the inferential model; a number of samples for each signal; signal-to-noise ratios for the signals; and a number of training vectors for the inferential model.

In some embodiments, the prognostic-surveillance system uses a sequential probability ratio test (SPRT) while detecting incipient anomalies, wherein the operational parameters include one or more of the following SPRT parameters: a desired false alarm probability parameter $\alpha$; a desired missed alarm probability parameter $\beta$; a variance parameter V; and a sensitivity parameter M.

In some embodiments, unselected functional objectives in the set of functional objectives become subordinate objectives and/or constraints while performing the Monte Carlo simulations.

In some embodiments, the system uses a stochastic gradient-descent technique to optimize the selected functional objective while performing Monte Carlo simulations.

In some embodiments, the system performs digital filtering operations on signals received by the prognostic-surveillance system to reduce signal-to-noise ratios of the signals, which improves prognostic accuracy and reduces detection time while increasing compute costs.

In some embodiments, the system performs intelligent data preprocessing operations on signals received by the prognostic-surveillance system to improve signal quality, which improves prognostic accuracy and reduces detection time while increasing compute costs.

In some embodiments, the system configures the prognostic-surveillance system to use the optimal values for the operational parameters during subsequent prognostic-surveillance operations.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
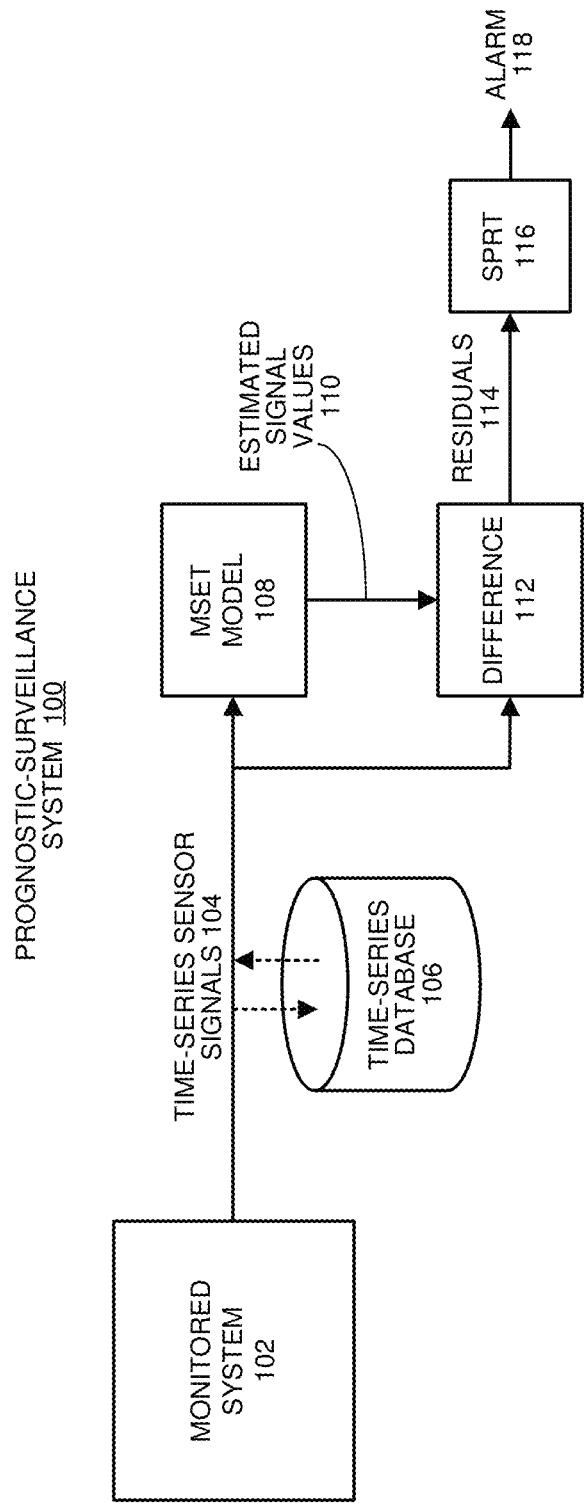
FIG. 1 illustrates an exemplary prognostic-surveillance system in accordance with the disclosed embodiments.

Before describing our technique for optimizing a prognostic-surveillance system further, we first describe an exemplary prognostic-surveillance system that the technique can operate on. FIG. 1 illustrates an exemplary non-adaptive prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a monitored system 102. Note that monitored system 102 can generally include any type of machinery or facility, which includes sensors and generates time-series signals. Moreover, time-series signals 104 can originate from any type of sensor, which can be located in a component in monitored system 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from monitored system 102 or from time-series database 106 into a multivariate state estimation technique (MSET) pattern-recognition model 108. Although it is advantageous to use an inferential model, such as MSET, for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables;

these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annuls of Mathematical Statistics.* 16 (2): 117-186.) In this way, prognostic-surveillance system 100 can proactively alert system operators to incipient anomalies, such as impending failures, hopefully with enough lead time so that such problems can be avoided or proactively fixed.

Figure 2:
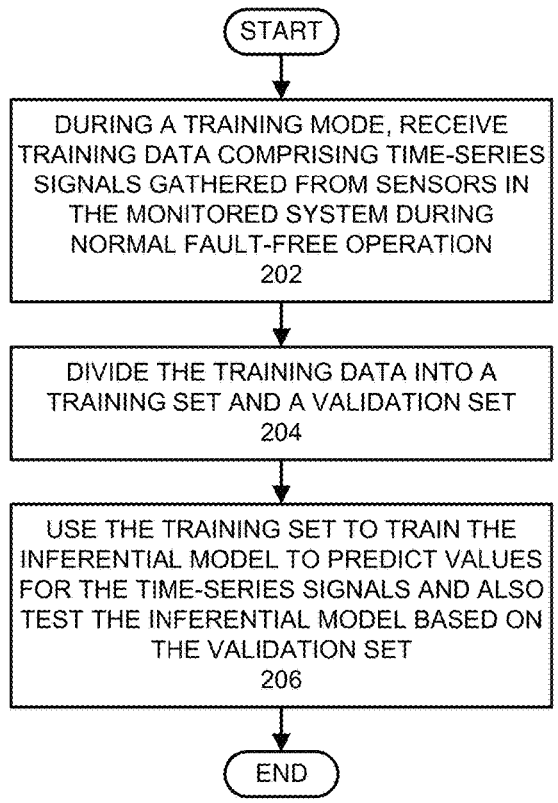
FIG. 2 presents a flow chart illustrating a process for training an inferential model in accordance with the disclosed embodiments.
Figure 3:
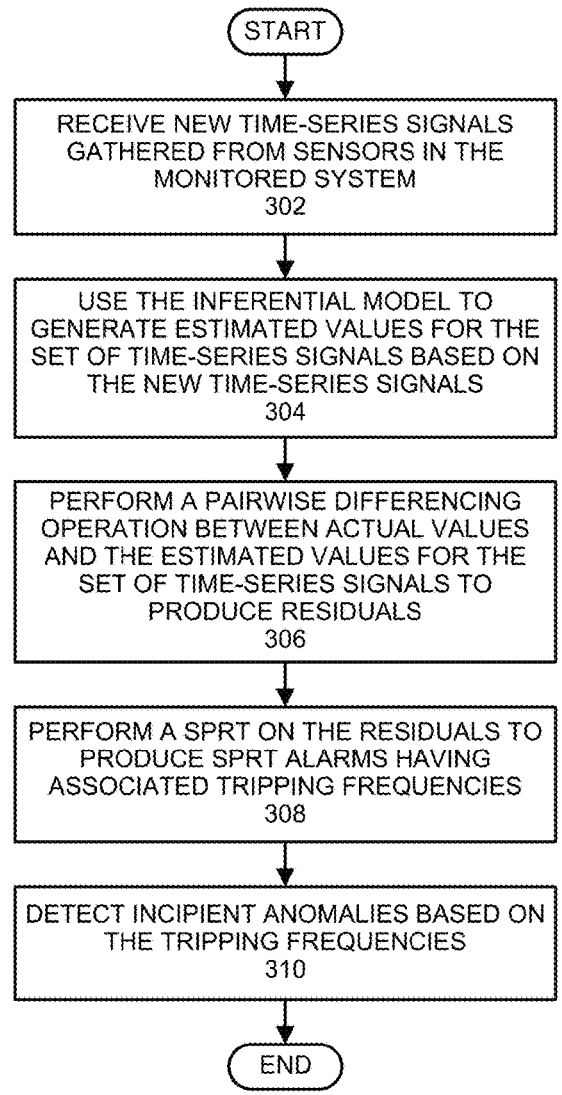
FIG. 3 presents a flow chart illustrating a process for using an inferential model to perform prognostic-surveillance operations in accordance with the disclosed embodiments.

The prognostic surveillance system 100 illustrated in FIG. 1 operates generally as follows. During a training mode, which is illustrated in the flow chart in FIG. 2, the system receives a training set comprising time-series signals gathered from sensors in the monitored system under normal fault-free operation (step 202). Next, the system divides the training data into a training set and a validation set (step 204). The system then trains the inferential model to predict values of the time-series signals based on the training set, and also tests the inferential model based on the validation set (step 206). During a subsequent surveillance mode, which is illustrated by the flow chart in FIG. 3, the system receives new time-series signals gathered from sensors in the monitored system (step 302). Next, the system uses the inferential model to generate estimated values for the set of time-series signals based on the new time-series signals (step 304). The system then performs a pairwise differencing operation between actual values and the estimated values for the set of time-series signals to produce residuals (step 306). The system then analyzes the residuals to detect the incipient anomalies in the monitored system. This involves performing a SPRT on the residuals to produce SPRT alarms with associated tripping frequencies (step 308), and then detecting incipient anomalies based on the tripping frequencies (step 310). Note that these incipient anomalies can be associated with an impending failure of the monitored system, or a malicious-intrusion event in the monitored system.

Overview

Our new optimization system allows a user to select their most business-critical or mission-critical prognostic-surveillance objective, such as: fast anomaly detection, high prognostic accuracy or low compute cost. The system then optimizes operational parameters for a prognostic-surveillance system to achieve the customer's selected objective. Note that when one objective is selected, other unselected objectives become the subordinate objectives/constraints during subsequent optimization operations. This ensures that the subordinate objectives will meet or exceed their minimal functional requirements if and when it is possible to do so.

Our new optimization system uses Monte Carlo simulations to determine how to achieve the objectives. Note that this optimization proceeds empirically (by performing Monte Carlo simulations) because of the stochastic relationships between the functional objectives and the underlying operational parameters of a prognostic-surveillance system, which renders this multi-objective, multi-constraint big-data optimization use case not amenable to conventional closed-form analytical optimization approaches.

The Monte Carlo simulations use a synthetic data pump, which produces time-series signals that are associated with various permutations of defects in a monitored asset. This synthetic data pump can be used to generate signals that vary operational parameters for the prognostic-surveillance system, including: a number of signals in the inferential model that is used by the prognostic-surveillance system; a number of samples for each signal; signal-to-noise ratios for the signals; and a number of training vectors for the inferential model. The Monte Carlo simulations can be used to answer a number of questions, such as: (1) "what happens if the signal-to-noise ratio in the time-series signals is greater or less?"; (2) "what happens when the sampling rates are greater or less?"; and (3) "what happens if more or fewer training vectors are used to train the inferential model?". Although these Monte Carlo simulations can require a lot of time, the simulations only need to be performed once for each customer.

Figure 4:
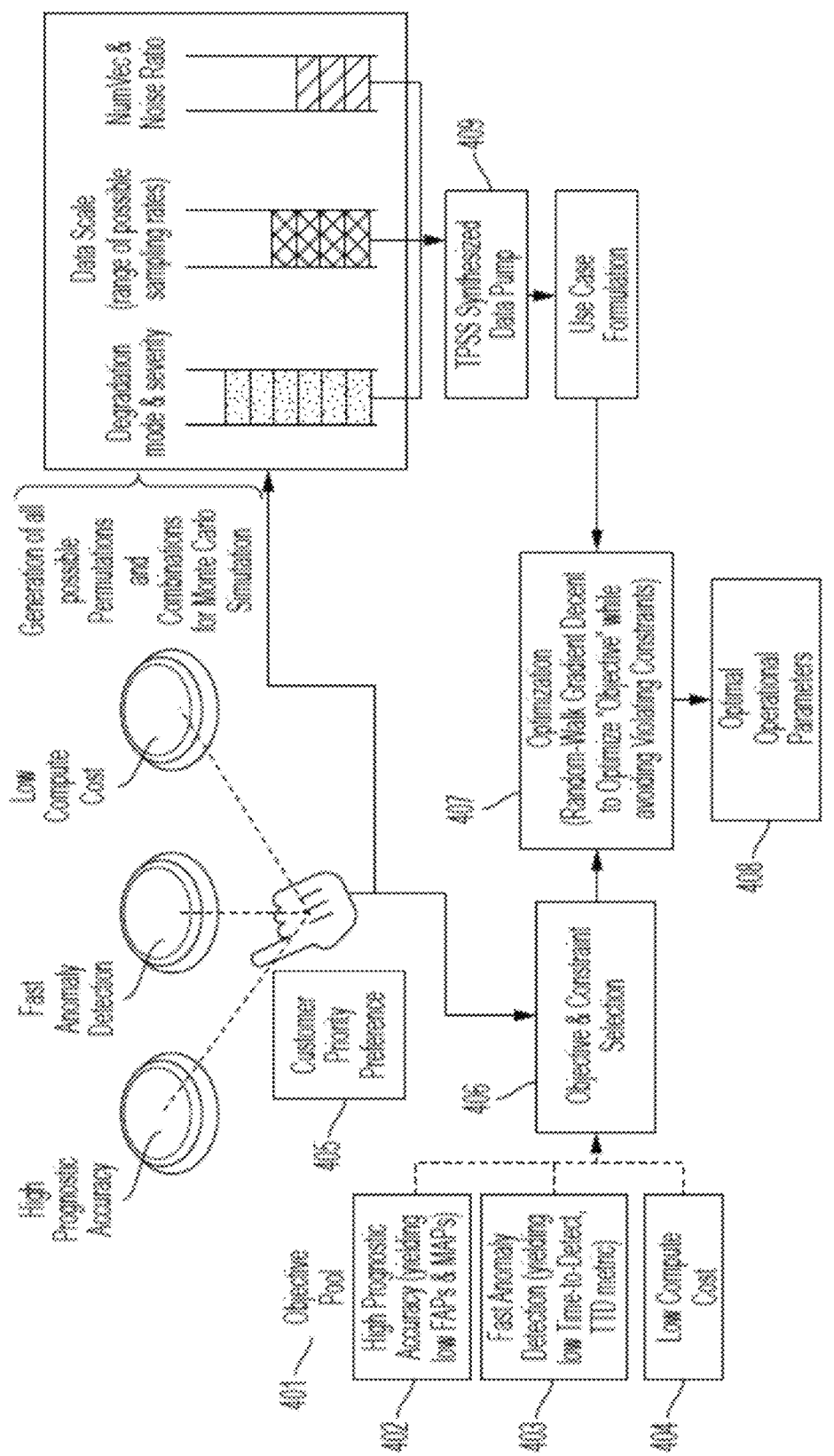
FIG. 4 presents a block diagram illustrating a process for optimizing objectives for a prognostic-surveillance system in accordance with the disclosed embodiments.

FIG. 4 presents a block diagram illustrating how our new optimization system operates. The system starts with an objective pool 401 that contains a number of objectives, including: (1) high prognostic accuracy 402; (2) fast anomaly detection 403; and (3) low compute cost 404. The system first enables a customer to express a priority preference 405 by selecting a specific functional objective to be optimized. This enables the system to perform an objective and constraint selection operation 406. During this operation, the system can convert the two unselected functional objectives into subordinate objectives, or alternatively into constraints.

The system then uses the objectives and constraints to perform an optimization operation 407 based on Monte Carlo simulations, which for example can perform a stochastic (random-walk) gradient descent operation to produce a set of optimal operational parameters 408 for the prognostic-surveillance system. Note that the Monte Carlo simulations can make use of data from a telemetry parameter synthesis system (TPSS) synthesized data pump 409. (See U.S. patent application Ser. No. 17/334,392, entitled "Signal Synthesizer Data Pump System" by inventors Matthew T. Gerdes, et al., filed on 28 May 2021.)

Figure 5:
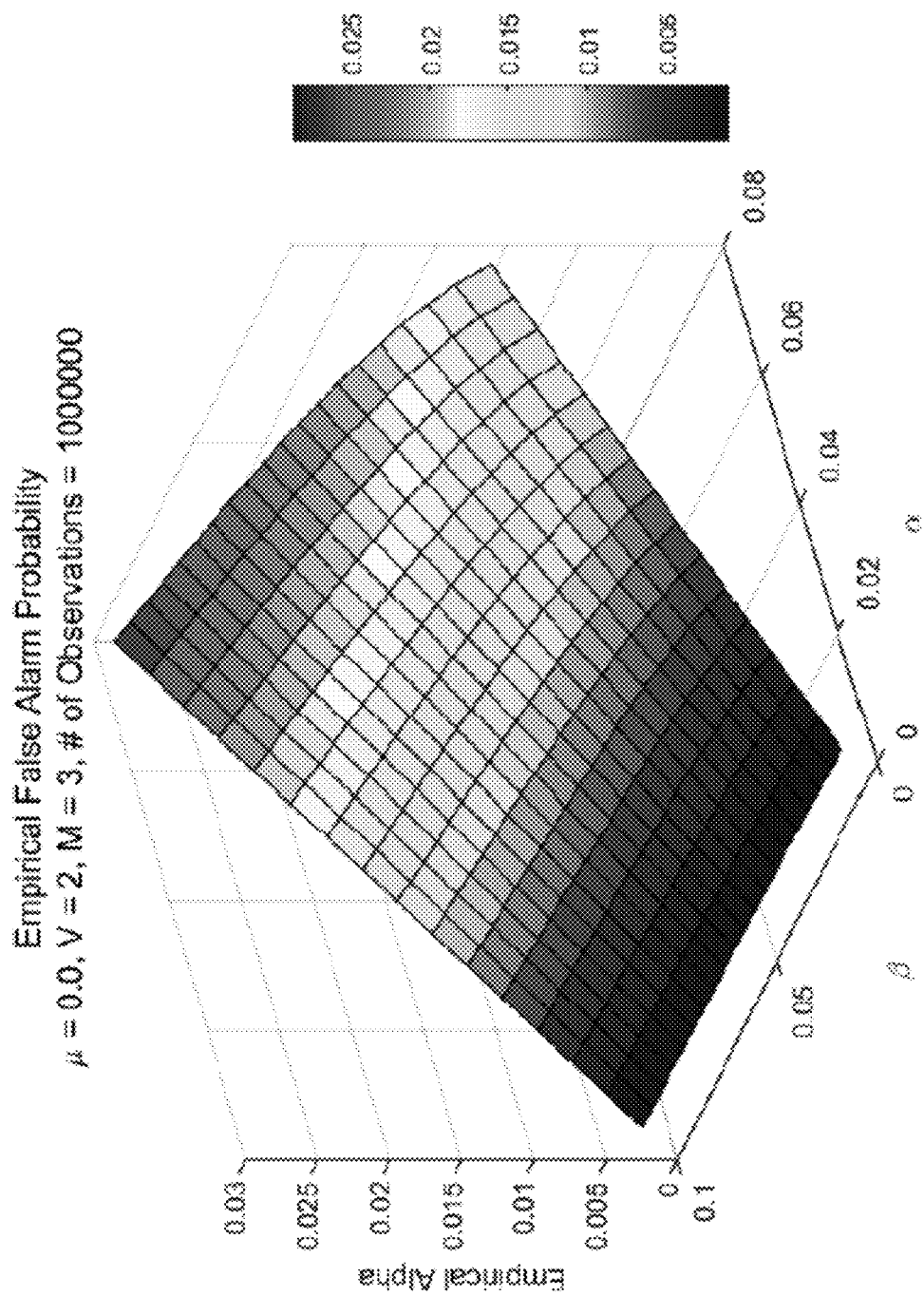
FIG. 5 presents a graph illustrating an empirical alpha as a function of a desired FAP target $\alpha$ and desired MAP target $\beta$ for a sequential probability ratio test (SPRT) in accordance with the disclosed embodiments.

These Monte Carlo simulations produce results that can be used to optimize the operational parameters of the prognostic-surveillance system. For example, the graph illustrated in FIG. 5 illustrates how an empirical FAP (empirical alpha) varies as a function of a desired FAP target ($\alpha$) and a desired MAP target ($\beta$). The number of observations in this example is 1,000,000, which is influenced by the sampling rate. (Note that the prognostic-surveillance system uses a sequential probability ratio test (SPRT) while detecting incipient anomalies, and the operational parameters can include the following SPRT parameters: a desired FAP target $\alpha$; a desired MAP target $\beta$; a mean of the residual $\mu$; a variance parameter V; and a sensitivity parameter M. Also note that these SPRT parameters $\alpha$, $\beta$, $\mu$, V and M can be varied during the Monte Carlo simulations.)

As mentioned above, the parameters $\mu$ and V are the "mean of the residuals," and "variance of the residuals" respectively, which are used to identify whether an anomaly may exist. If no anomaly exists (when $\mu$=0), then we do not foresee any false alarms. If a large number of false alarms are produced when no anomalies actually exist, the graph in FIG. 5 can be used to detect this issue. (It means that NumVecs was too small, and needs to be adjusted higher. Or, in one embodiment of the invention, NumVecs is automatically adjusted higher in a small iterative "inner loop" until the empirical false alarms are less than a).

In some cases, the Monte Carlo simulations can be used to determine what the empirical false alarm rate actually is for the customer's signals. For example if a customer has poor-quality sensors and they want to achieve a 2% FAP and a 2% MAP, their data quality may be so bad that it is not feasible to achieve their goal, and this fact will be discovered by the Monte Carlo simulations. We can then tell the customer the desired FAP and MAP cannot be achieved with the present signal quality and/or sampling rate. In another example, a customer may want to be able to detect a developing fault within ten seconds. However, if they have poor-quality signals and a slow sampling rate, they may be prevented from doing so. In this case, we need to tell the customer that the desired detection speed is not possible without better sensors or a higher sampling rate.

Figure 6:
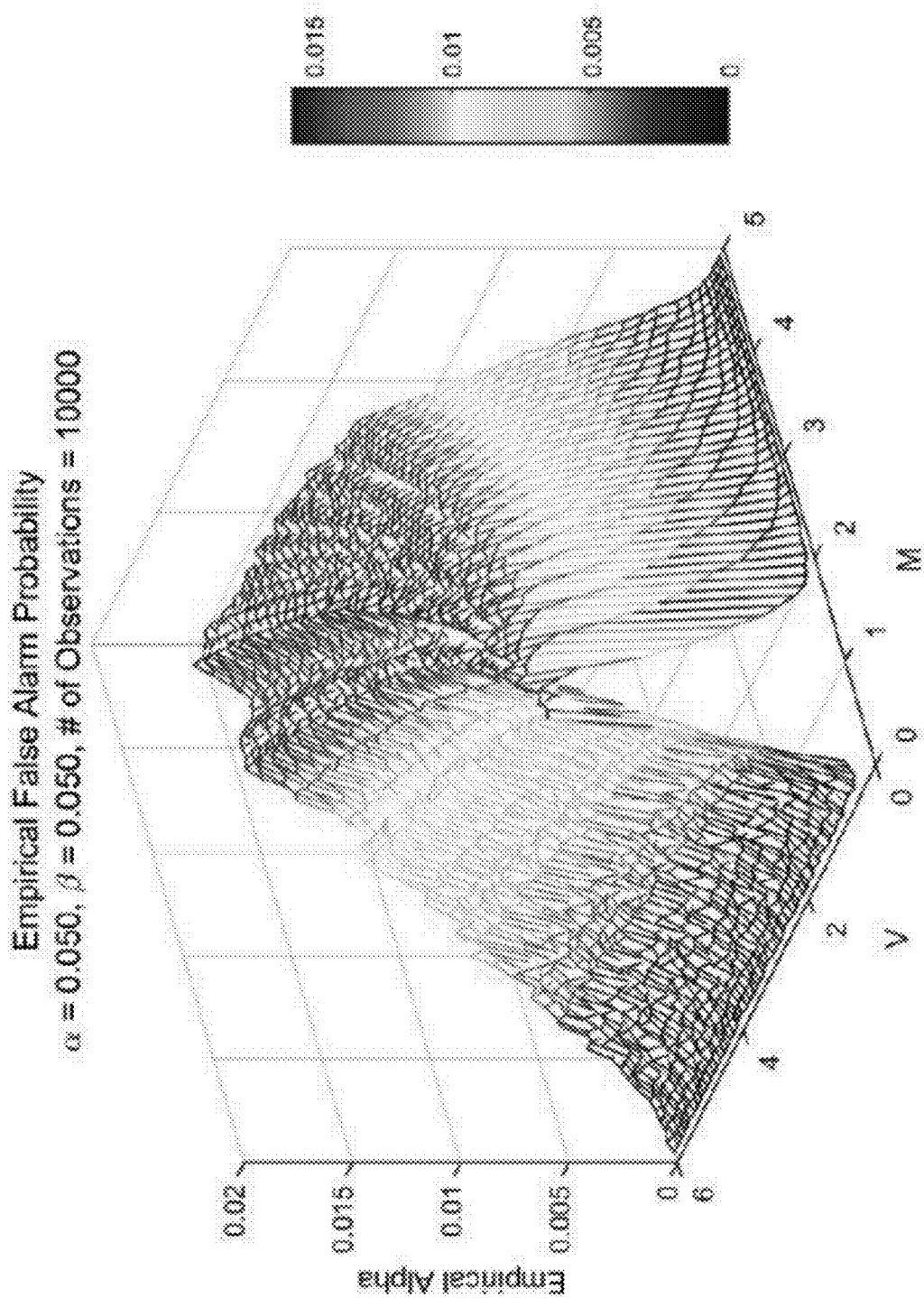
FIG. 6 presents a graph illustrating an empirical alpha as a function of a signal variance parameter V and sensitivity parameter M for a SPRT in accordance with the disclosed embodiments.
Figure 7:
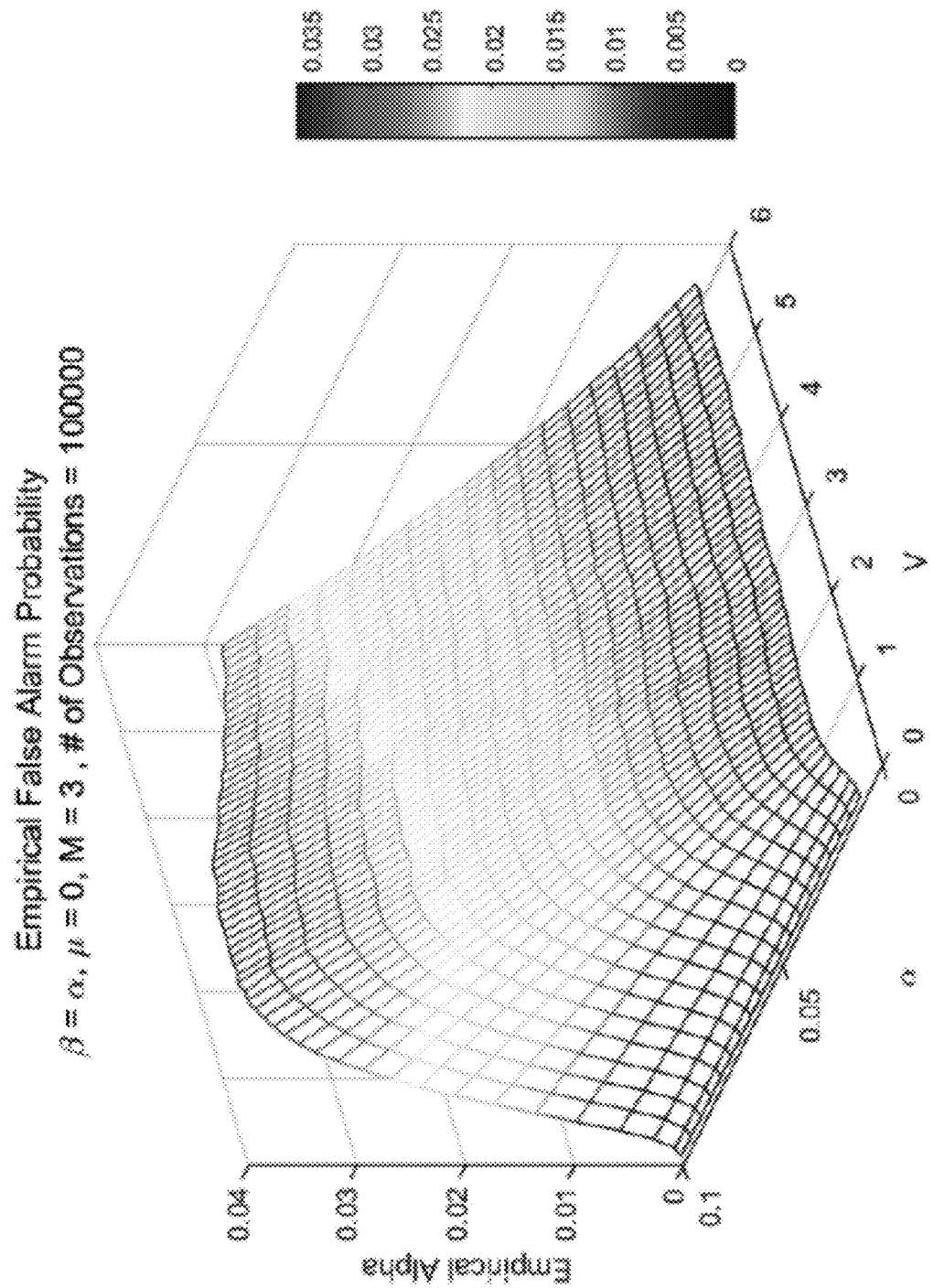
FIG. 7 presents a graph illustrating an empirical alpha as a function of $\alpha$ and V in accordance with the disclosed embodiments.

FIG. 6 presents a graph that illustrates empirical alpha as a function of the SPRT variance parameter V and sensitivity parameter M. If the signal-to-noise ratio (indicated by the variance parameter V) is sufficiently poor, for some combinations of V and M, we move into a zone on the graph where empirical alpha is unacceptably high. In this case, we can adjust M and/or V to move out of the unacceptable zone. For example, we can perform a filtering operation to reduce signal variance, which will reduce empirical alpha. However, this increases compute cost. Note that if the system is outside of the unacceptable zone, we can also optimize the operational parameters for fast anomaly detection and low compute cost. FIG. 7 presents a graph that illustrates empirical alpha as a function of $\alpha$ and V, wherein $\beta=\alpha$.

Figure 8:
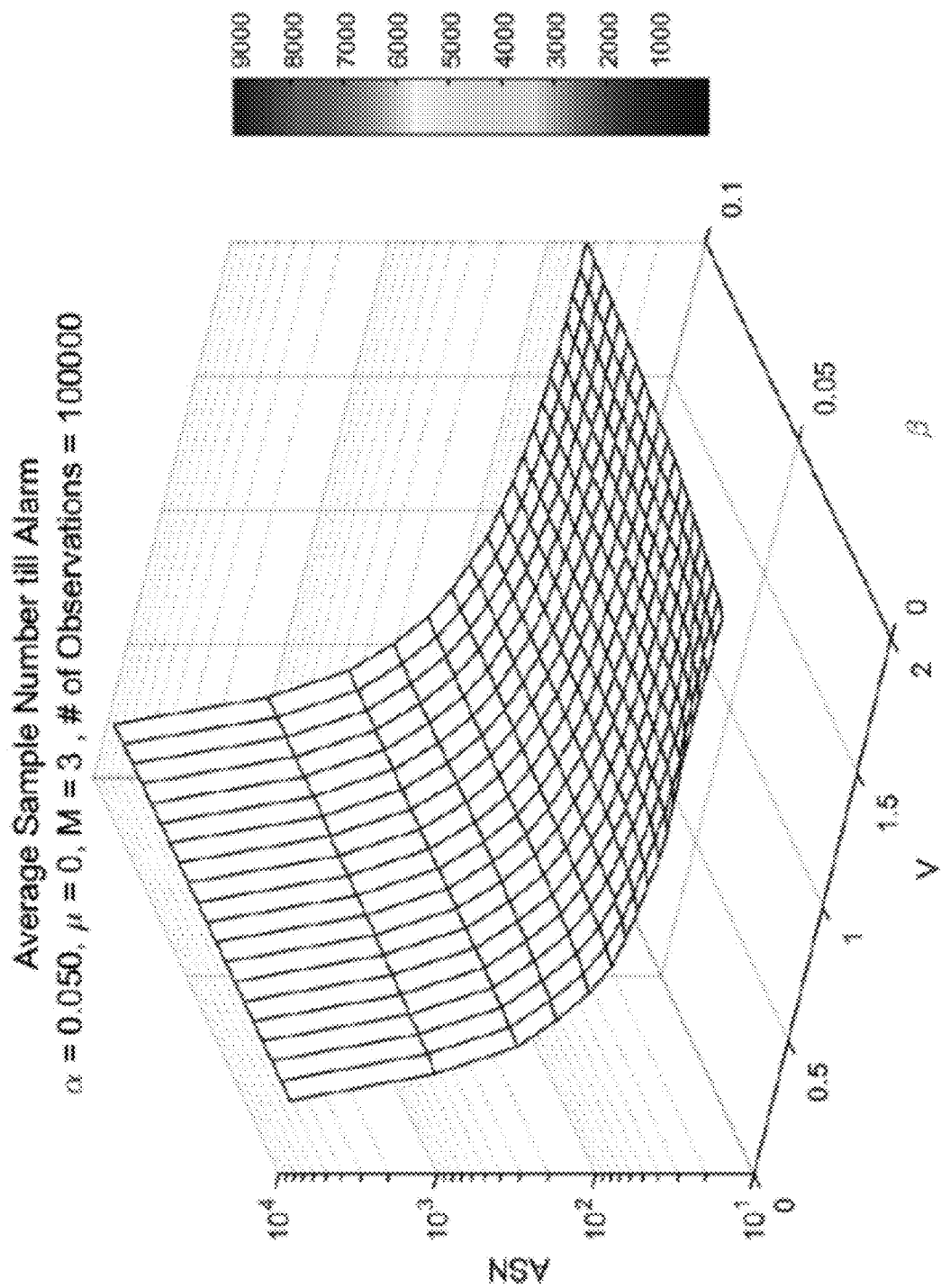
FIG. 8 presents a graph illustrating an average sample number till alarm as a function of V and $\beta$ in accordance with the disclosed embodiments.
Figure 9:
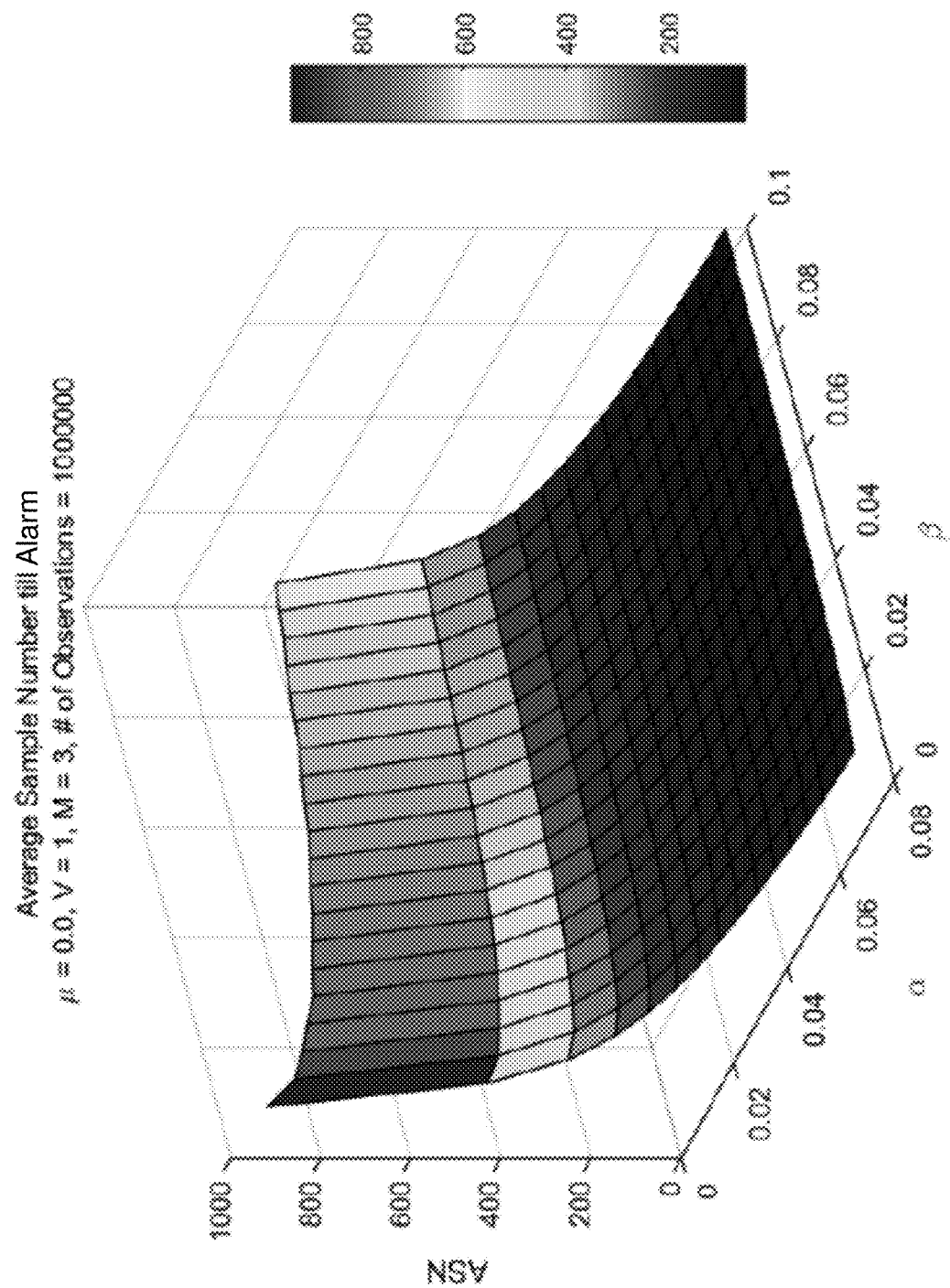
FIG. 9 presents a graph illustrating an average sample number till alarm as a function of $\alpha$ and $\beta$ in accordance with the disclosed embodiments.

FIGS. 8 and 9 are associated with the fast anomaly detection. More specifically, FIG. 8 presents a graph that illustrates the average sample number till alarm (ASN) as a function of V and $\beta$, and FIG. 9 presents a graph that illustrates the ASN as a function of $\alpha$ and $\beta$. In both of these graphs, the ASN metric provides an indicator of how long it takes to detect an anomaly. For example, a customer might want to know within 10 seconds whether an anomaly exists. In portions of the graph where the ASN is below 200, the prognostic-surveillance system is able to make a decision very quickly; this results in an ASN number below 200. By carefully examining these graphs, we can adjust the operational parameters to achieve fast anomaly detection times while simultaneously providing good performance for other subordinate objectives. Also, if it is not possible to achieve the desired fast detection time, the optimization process will detect this problem. Note that it is important for the customer to be aware of this problem before they actually proceed to implement a prognostic-surveillance system.

Figure 10A:
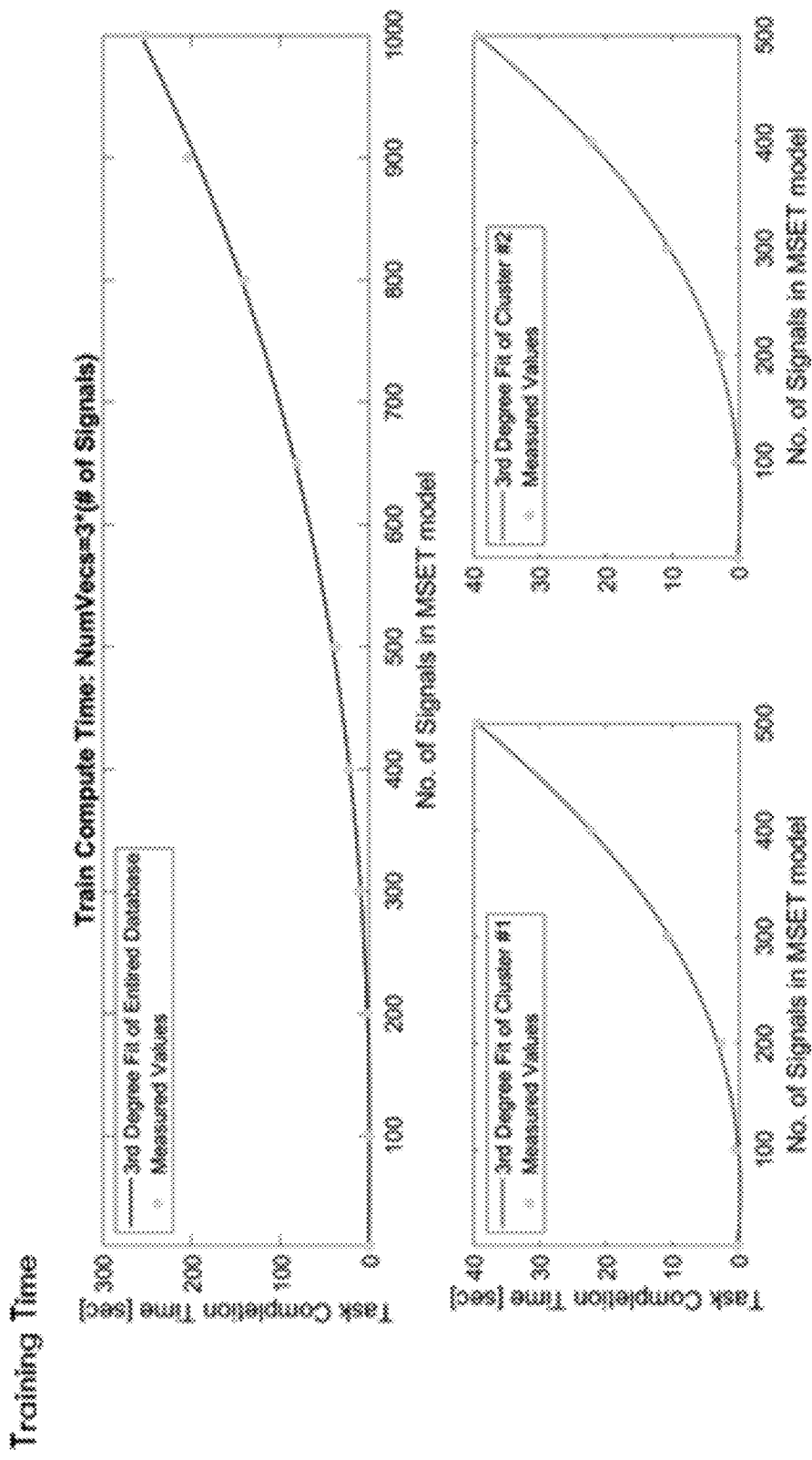
FIG. 10A presents graphs illustrating how MSET model-training time varies as a function of the number of signals in the MSET model in accordance with the disclosed embodiments.
Figure 10B:
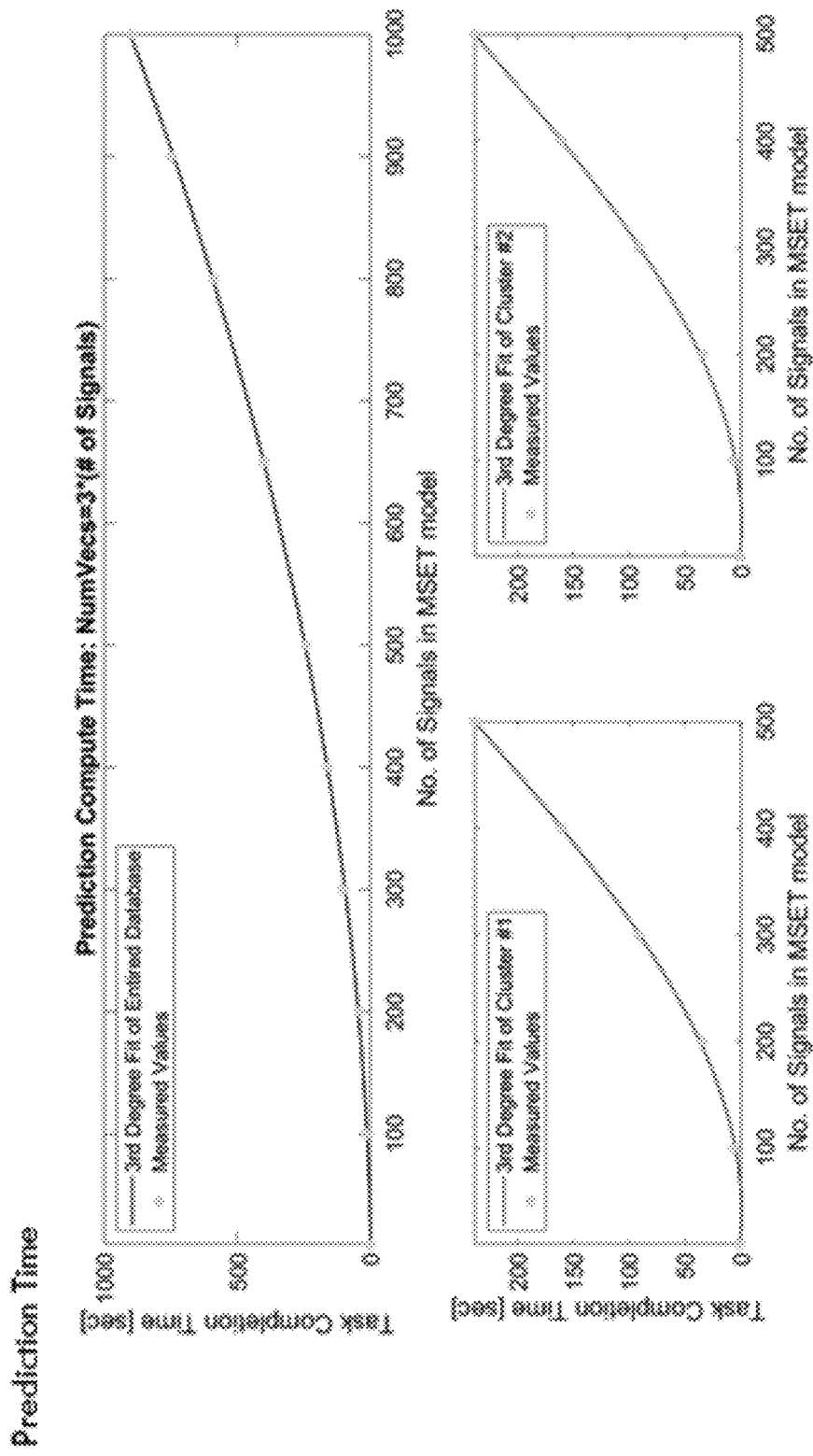
FIG. 10B presents graphs illustrating how MSET model-prediction time varies as a function of the number of signals in the MSET model in accordance with the disclosed embodiments.

FIGS. 10A and 10B present graphs that demonstrate the nonlinear relationship between the number of signals in an MSET model and the corresponding computation time required to train the MSET model (FIG. 10A) and the corresponding computation time required to detect an anomaly (FIG. 10B). As we increase the number of signals, the sampling rate and/or the number of vectors, the compute cost goes up nonlinearly. This means that if we want to improve FAP, we cannot arbitrarily increase the number of signals, the sampling rate or the number of vectors, because the compute cost may become unacceptably high.

Also note that signals are sometimes quantized, and if the resulting quality of the signals is poor, we can use an intelligent data preprocessing (IDP) technique to perform a preprocessing operation to improve the signals that feed into the prognostic-surveillance system. This has a compute cost, but it can significantly reduce FAP and MAP rates and can also reduce ASN. In situations where the signal quality is insufficient to meet the customer's functional objectives for accuracy and/or fast detection time, the sampling rate is maxed out, and it is too costly to replace the sensors, we can possibly use an IDP technique to improve the signals to meet the functional objectives with a slightly higher compute cost. (For a description of various IDP techniques, please see U.S. Pat. No. 10,740,310, entitled "Intelligent Preprocessing of Multi-Dimensional Time-Series Data" by inventors Dieter Gawlick, et al., filed on 10 Mar. 2018.)

Process of Producing Synthetic Signals

Figure 11:
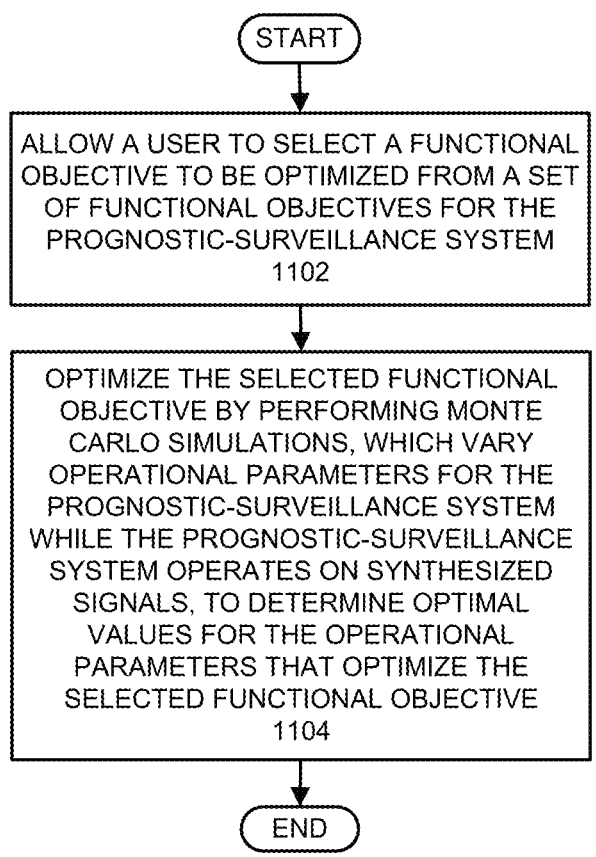
FIG. 11 presents a flow chart illustrating a process for optimizing a prognostic surveillance system to meet a selected functional objective in accordance with the disclosed embodiments.

FIG. 11 presents a flow chart illustrating a process for optimizing an ML-based prognostic-surveillance system to achieve a user-selectable functional objective in accordance with the disclosed embodiments. During operation, the system allows a user to select a functional objective to be optimized from a set of functional objectives for the prognostic-surveillance system (step 1102). Next, the system optimizes the selected functional objective by performing Monte Carlo simulations, which vary operational parameters for the prognostic-surveillance system while the prognostic-surveillance system operates on synthesized signals, to determine optimal values for the operational parameters that optimize the selected functional objective (step 1104).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for optimizing a prognostic-surveillance system to achieve a user-selectable functional objective, comprising:
    receiving a selection of a functional objective to be optimized, wherein the functional objective to be optimized is selected from a set of functional objectives configured for the prognostic-surveillance system, wherein the functional objective comprises a quality of information objective; and
    optimizing the selected functional objective, wherein the optimizing the selected functional objective comprises:
        performing Monte Carlo simulations using a synthetic data pump,
        wherein the synthetic data pump generates time-series signals that vary operational parameters for the prognostic-surveillance system in response to defects in a monitored asset,
        wherein the Monte Carlo simulations vary the operational parameters for the prognostic-surveillance system while the prognostic-surveillance system operates on synthesized signals;
        determining optimal values for the operational parameters that optimize the selected functional objective; and
        determining, based on the Monte Carlo simulations, a quality of sensors, and based on the quality of the sensors, adjusting a sampling rate.

2. The method of claim 1, wherein the set of functional objectives for the prognostic-surveillance system comprises:
    fast anomaly detection, which can be evaluated in terms of an average sample number (ASN) for a detection decision;

high prognostic accuracy, which can be evaluated in terms of false alarm probabilities (FAPs) and missed alarm probabilities (MAPs); and low compute cost, which can be evaluated in terms of required computational operations and memory usage.

3. The method of claim 1, wherein the prognostic-surveillance system uses an inferential model while detecting incipient anomalies, and wherein the operational parameters include one or more of the following:

a number of signals in the inferential model;
a number of samples for each signal;
signal-to-noise ratios for the signals; and
a number of training vectors for the inferential model.

4. The method of claim 3, wherein the prognostic-surveillance system uses a sequential probability ratio test (SPRT) while detecting incipient anomalies, and wherein the operational parameters include one or more of the following SPRT parameters:

a desired false alarm probability parameter $\alpha$;
a desired missed alarm probability parameter $\beta$;
a variance parameter V; and
a sensitivity parameter M.

5. The method of claim 1, wherein unselected functional objectives in the set of functional objectives become subordinate objectives and/or constraints while performing the Monte Carlo simulations.

6. The method of claim 1, wherein the method uses a stochastic gradient-descent technique to optimize the selected functional objective while performing the Monte Carlo simulations.

7. The method of claim 1, wherein the method further comprises performing digital filtering operations on signals received by the prognostic-surveillance system to reduce signal-to-noise ratios of the signals.

8. The method of claim 1, wherein the method further comprises performing intelligent data preprocessing operations on signals received by the prognostic-surveillance system to improve signal quality.

9. The method of claim 1, wherein the method further comprises configuring the prognostic-surveillance system to use the optimal values for the operational parameters during subsequent prognostic-surveillance operations.

10. The method according to claim 1, wherein the prognostic-surveillance system determines subordinate objectives based on the received functional objective to be optimized.

11. The method according to claim 1, wherein the Monte Carlo simulations are performed for a user in a single instance.

12. A non-transitory computer-readable storage medium storing instructions that when executed by a computer cause the computer to perform a method for optimizing a prognostic-surveillance system to achieve a user-selectable functional objective, the method comprising:

receiving a selection of a functional objective to be optimized, wherein the functional objective to be optimized is selected from a set of functional objectives configured for the prognostic-surveillance system, wherein the functional objective comprises a quality of information objective; and optimizing the selected functional objective, wherein the optimizing the selected functional objective comprises:
performing Monte Carlo simulations using a synthetic data pump,
wherein the synthetic data pump generates time-series signals that vary operational parameters for the prognostic-surveillance system in response to defects in a monitored asset,
wherein the Monte Carlo simulations vary the operational parameters for the prognostic-surveillance system while the prognostic-surveillance system operates on synthesized signals;
determining optimal values for the operational parameters that optimize the selected functional objective; and
determining, based on the Monte Carlo simulations, a quality of sensors, and based on the quality of the sensors, adjusting a sampling rate.

13. The non-transitory computer-readable storage medium of claim 12, wherein the set of functional objectives for the prognostic-surveillance system comprises:

fast anomaly detection, which can be evaluated in terms of an average sample number (ASN) for a detection decision;

high prognostic accuracy, which can be evaluated in terms of false alarm probabilities (FAPs) and missed alarm probabilities (MAPs); and low compute cost, which can be evaluated in terms of required computational operations and memory usage.

14. The non-transitory computer-readable storage medium of claim 12, wherein the prognostic-surveillance system uses an inferential model while detecting incipient anomalies, and wherein the operational parameters include one or more of the following:

a number of signals in the inferential model;
a number of samples for each signal;
signal-to-noise ratios for the signals; and
a number of training vectors for the inferential model.

15. The non-transitory computer-readable storage medium of claim 14, wherein the prognostic-surveillance system uses a sequential probability ratio test (SPRT) while detecting incipient anomalies, and wherein the operational parameters include one or more of the following SPRT parameters:

a desired false alarm probability parameter $\alpha$;
a desired missed alarm probability parameter $\beta$;
a variance parameter V; and
a sensitivity parameter M.

16. The non-transitory computer-readable storage medium of claim 12, wherein unselected functional objectives in the set of functional objectives become subordinate objectives and/or constraints while performing the Monte Carlo simulations.

17. The non-transitory computer-readable storage medium of claim 12, wherein the method further comprises performing digital filtering operations on signals received by the prognostic-surveillance system to reduce signal-to-noise ratios of the signals.

18. The non-transitory computer-readable storage medium of claim 12, wherein the method further comprises performing intelligent data preprocessing operations on signals received by the prognostic-surveillance system to improve signal quality.

19. A system that optimizes a prognostic-surveillance system to achieve a user-selectable functional objective, comprising:

a computing system with one or more processors and one or more associated memories; and an optimization processor that executes on the computing system, wherein during operation, the optimization processor:

receives a selection of a functional objective to be optimized, wherein the functional objective to be optimized is selected from a set of functional objectives configured for the prognostic-surveillance system, wherein the functional objective comprises a quality of information objective, and optimizes the selected functional objective, wherein the optimizing the selected functional objective comprises:

performing Monte Carlo simulations using a synthetic data pump, wherein the synthetic data pump generates time-series signals that vary operational parameters for the prognostic-surveillance system in response to defects in a monitored asset, wherein the Monte Carlo simulations vary the operational parameters for the prognostic-surveillance system while the prognostic-surveillance system operates on synthesized signals;

determining optimal values for the operational parameters that optimize the selected functional objective; and determining, based on the Monte Carlo simulations, a quality of sensors, and based on the quality of the sensors, adjusting a sampling rate.

20. The system of claim 19, wherein the set of functional objectives for the prognostic-surveillance system comprises:

fast anomaly detection, which can be evaluated in terms of an average sample number (ASN) for a detection decision;

high prognostic accuracy, which can be evaluated in terms of false alarm probabilities (FAPs) and missed alarm probabilities (MAPs); and low compute cost, which can be evaluated in terms of required computational operations and memory usage.

* * * * *